(12) United States Patent
Poulin

(10) Patent No.: US 10,211,862 B2
(45) Date of Patent: Feb. 19, 2019

(54) METHODS FOR REDUCING RADIATED EMISSIONS FROM POWER AMPLIFIERS

(71) Applicant: Skyworks Solutions, Inc., Woburn, MA (US)

(72) Inventor: Grant Darcy Poulin, Carp (CA)

(73) Assignee: Skyworks Solutions, Inc., Woburn, MA (US)

( * ) Notice: Subject to any disclaimer, the term of this patent is extended or adjusted under 35 U.S.C. 154(b) by 117 days.

(21) Appl. No.: 15/280,153

(22) Filed: Sep. 29, 2016

(65) Prior Publication Data

US 2017/0091366 A1 Mar. 30, 2017

Related U.S. Application Data

(60) Provisional application No. 62/235,320, filed on Sep. 30, 2015.

(51) Int. Cl.
*H04B 1/04* (2006.01)
*G06F 17/50* (2006.01)
(Continued)

(52) U.S. Cl.
CPC ....... *H04B 1/0475* (2013.01); *G06F 17/5036* (2013.01); *G06F 17/5072* (2013.01); *H03F 1/02* (2013.01); *H03F 1/0277* (2013.01); *H03F 1/32* (2013.01); *H03F 3/19* (2013.01); *H03F 3/211* (2013.01); *H03F 3/24* (2013.01); *H03F 3/245* (2013.01); *H03F 3/68* (2013.01); *H03F 3/72* (2013.01); *H04B 17/13* (2015.01); *H05K 1/181* (2013.01); *H05K 3/0005* (2013.01); *G06F 2217/78* (2013.01); *G06F 2217/82* (2013.01); *H03F 2200/114* (2013.01); *H03F 2200/451* (2013.01); *H03F 2201/3215* (2013.01); *H03F 2203/7221* (2013.01); *H03F 2203/7236* (2013.01); *H04B 2001/045* (2013.01); *H05K 2201/10098* (2013.01); *H05K 2201/10166* (2013.01); *H05K 2201/10522* (2013.01)

(58) Field of Classification Search
CPC .................................................. G06F 17/5072
USPC ......................................................... 716/109
See application file for complete search history.

(56) References Cited

U.S. PATENT DOCUMENTS 6,107,886 A 8/2000 Kusakabe et al.
6,285,251 B1 9/2001 Dent et al.
(Continued)

*Primary Examiner* — Suresh Memula
(74) *Attorney, Agent, or Firm* — Knobbe Martens Olson & Bear LLP

(57) ABSTRACT

Apparatus and methods for orienting power amplifiers are disclosed herein. In certain implementations, a method of determining the physical orientation of power amplifiers laid out on a printed circuit board (PCB) is provided. The method includes determining an amount of emissions radiated by a first power amplifier die that is positioned in a first orientation on the PCB. The method further includes determining an amount of emissions radiated by a second power amplifier die that is positioned in a second orientation on the PCB. The method further includes determining a third orientation of the second power amplifier die different than the second orientation, such that when the second power amplifier die is in the third orientation, the amount of emissions radiated by the first power amplifier die and the amount of emissions radiated by the second power amplifier die are distributed in different directions.

20 Claims, 10 Drawing Sheets

(51) Int. Cl.
  *H05K 3/00* (2006.01)
  *H03F 3/24* (2006.01)
  *H03F 3/19* (2006.01)
  *H04B 17/13* (2015.01)
  *H03F 1/32* (2006.01)
  *H03F 3/21* (2006.01)
  *H05K 1/18* (2006.01)
  *H03F 1/02* (2006.01)
  *H03F 3/68* (2006.01)
  *H03F 3/72* (2006.01)

(56) References Cited

U.S. PATENT DOCUMENTS

| | | |
|---|---|---|
| 6,737,948 B2 | 5/2004 | Aoki et al. |
| 9,350,076 B1 | 5/2016 | Cripe |
| 9,729,177 B2 * | 8/2017 | Poulin ................. H04B 1/0475 |
| 2014/0129754 A1 | 5/2014 | Pruthi et al. |
| 2015/0194942 A1 | 7/2015 | Anderson et al. |
| 2016/0322701 A1 | 11/2016 | Lin et al. |
| 2018/0013391 A1 * | 1/2018 | Maalouf ................. H03F 3/193 |

\* cited by examiner

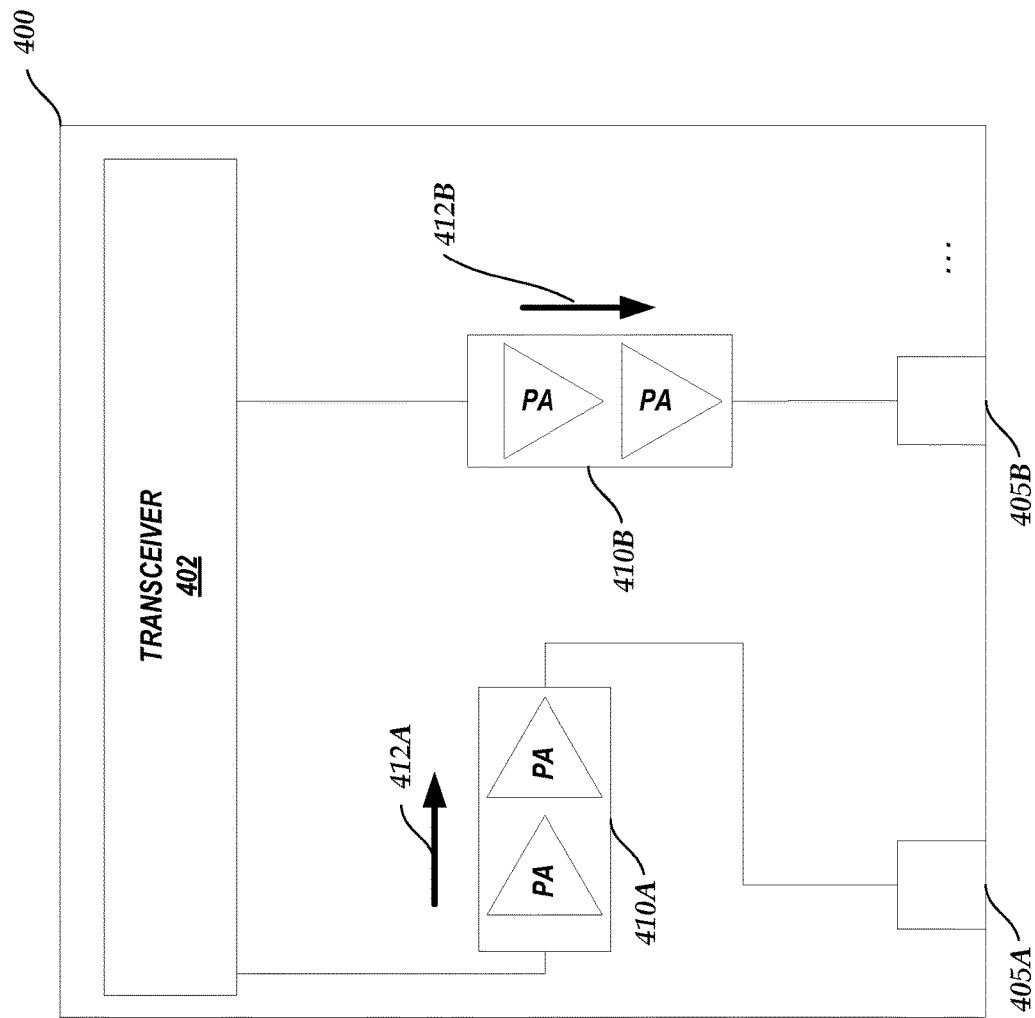
FIG. 5C
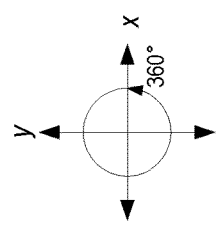

METHODS FOR REDUCING RADIATED EMISSIONS FROM POWER AMPLIFIERS

CROSS-REFERENCE TO RELATED APPLICATIONS

This application claims the benefit of priority under 35 U.S.C. § 119(e) of U.S. Provisional Patent Application No. 62/235,320, filed Sep. 30, 2015 and titled "APPARATUS AND METHODS FOR REDUCING RADIATED EMISSIONS FROM POWER AMPLIFIERS," which is hereby incorporated by reference herein in its entirety.

BACKGROUND

Field

Embodiments of the invention relate to electronic systems, and in particular, to power amplifiers for radio frequency (RF) electronics.

Description of the Related Technology

Power amplifiers can be included in fixed and mobile devices to amplify radio frequency (RF) signals for transmission via antennas. For example, in devices using the WLAN IEEE 802.11 standard (commonly referred to as WI-FI), such as the IEEE 802.11ac standard, a power amplifier can be used to provide amplification to one or more transmit carrier frequencies.

Many mobile devices operate in the currently unlicensed frequency bands of 2.4 GHz (e.g., about 2.39 GHz to 2.4835 GHz) and 5 GHz (e.g., about 5.25 GHz to 5.35 GHz and about 5.46 GHz to 5.85 GHz). However, the Federal Communications Commission (FCC) has mandated very stringent emissions requirements for certain restricted frequency bands, such as 4.5 GHz to 5.25 GHz and 10.6 GHz to 12.7 GHz.

SUMMARY

These restricted frequency bands can be of relevance to mobile devices that operate in the unlicensed frequency bands because the second harmonic spectral content generated by power amplifiers operating in the unlicensed frequency bands may fall in the restricted frequency bands. Thus, managing the emissions radiated by power amplifiers operating in the unlicensed frequency bands is important.

In certain embodiments, the present disclosure relates to a method of determining the physical orientation of power amplifiers laid out on a printed circuit board. The method comprises determining an amount of emissions radiated by a first power amplifier die that is positioned in a first orientation on the printed circuit board; determining an amount of emissions radiated by a second power amplifier die that is positioned in a second orientation on the printed circuit board; and determining a third orientation of the second power amplifier die different than the second orientation, such that when the second power amplifier die is in the third orientation, the amount of emissions radiated by the first power amplifier die and the amount of emissions radiated by the second power amplifier die are distributed in different directions.

The method of the preceding paragraph can have any sub-combination of the following features: where an output of the first power amplifier die faces a first direction and the emissions radiated by the first power amplifier die are radiated in the first direction; where the third orientation of the second power amplifier die includes an output of the second power amplifier die facing a second direction different than the first direction; where the method further comprises determining an amount of emissions radiated by a first antenna coupled to the first power amplifier die; where determining a third orientation of the second power amplifier die includes determining the orientation of the second power amplifier die such that the amount of emissions radiated by the first power amplifier die, the amount of emissions radiated by the second power amplifier die, and the amount of emissions radiated by the first antenna die are distributed in different directions; where the method further comprises determining an adjusted orientation of the first antenna such that the amount of emissions radiated by the first power amplifier die, the second power amplifier die, or the first antenna in a first direction is less than a threshold value; where determining a third orientation of the second power amplifier die includes determining the third orientation of the second power amplifier die such that the amount of emissions radiated by the first power amplifier die or the second power amplifier die in a first direction is less than a threshold value; where the first and second power amplifier dies are physical devices laid out on the printed circuit board; where determining an amount of emissions radiated by a first power amplifier die and determining an amount of emissions radiated by a second power amplifier die both include measuring the amount of emissions using a sensor; where determining an adjusted orientation of the second power amplifier die includes physically adjusting the orientation of the second power amplifier die from the second orientation to the third orientation, and measuring an amount emissions radiated by the second power amplifier die when in the third orientation using the sensor; where the first and second power amplifier dies are simulated power amplifier dies instantiated in a software circuit simulator; where the determining an amount of emissions radiated by a first power amplifier die and determining an amount of emissions radiated by a second power amplifier die both include using the software circuit simulator to simulate an amount of emissions; where determining an adjusted orientation of the second power amplifier die includes using the software circuit simulator to simulate a change in the orientation of the second power amplifier die from the second orientation to the third orientation, and using the software circuit simulator to measure an amount emissions radiated by the second power amplifier die when in the third orientation; where each of the first and second power amplifier dies include a single power amplifier; and where one or more of the first and second power amplifier dies include multiple power amplifiers.

In certain embodiments, the present disclosure relates to a method of determining the physical orientation of power amplifiers laid out on a printed circuit board. The method comprises determining an amount of emissions radiated by a first power amplifier die that is positioned in a first orientation on the printed circuit board; determining an amount of emissions radiated by a second power amplifier die that is positioned in a second orientation on the printed circuit board; determining whether the amount of emissions radiated by the first power amplifier die in a first direction and the amount of emissions radiated by the second power amplifier die in the first direction exceed a threshold value; determining a third orientation of the second power amplifier die different than the second orientation in response to a determination that the amount of emissions radiated by the first power amplifier die in the first direction and the amount of emissions radiated by the second power amplifier die in the first direction exceed the threshold value, such that the amount of emissions radiated by the first power amplifier die in the first direction while in the first orientation and the amount of emissions radiated by the second power amplifier die in the first direction while in the third orientation are below the threshold value; and adjusting an orientation of the second power amplifier die from the second orientation to the third orientation.

The method of the preceding paragraph can have any sub-combination of the following features: where the third orientation of the second power amplifier die includes an output of the second power amplifier die facing a second direction different than the first direction; and where adjusting an orientation of the second power amplifier die from the second orientation to the third orientation includes de-soldering the second power amplifier die from the printed circuit board and re-soldering the second power amplifier due to the printed circuit board in the third orientation.

In certain embodiments, the present disclosure relates to a non-transitory computer-readable medium having stored thereon a simulation application configured to run on a computing system. The simulation application comprises executable program code that directs the computing device to implement a process comprising determining an amount of emissions radiated by a first power amplifier die that is positioned in a first orientation on a simulated printed circuit board; determining an amount of emissions radiated by a second power amplifier die that is positioned in a second orientation on the simulated printed circuit board; determining whether the amount of emissions radiated by the first power amplifier die in a first direction and the amount of emissions radiated by the second power amplifier die in the first direction exceed a threshold value; adjusting an orientation of the second power amplifier die to a third orientation different than the second orientation in response to a determination that the amount of emissions radiated by the first power amplifier die in the first direction and the amount of emissions radiated by the second power amplifier die in the first direction exceed the threshold value; and in response to a determination that the amount of emissions radiated by the first power amplifier die in the first direction while in the first orientation and the amount of emissions radiated by the second power amplifier in the first direction while in the third orientation exceed the threshold value, continuing to adjust an orientation of the second power amplifier due until the amount of emissions radiated by the first power amplifier die in the first direction and the amount of emissions radiated by the second power amplifier die in the first direction is below the threshold value.

The non-transitory computer-readable medium of the preceding paragraph can have any sub-combination of the following features: where the process includes generating a file that instructs a soldering machine to orient the first power amplifier die in the first orientation on an actual printed circuit board and to orient the second power amplifier die in the third orientation on the actual printed circuit board.

In certain embodiments, the present disclosure relates to a power amplifier system. The power amplifier system comprises a first power amplifier die that is positioned in a first orientation on a printed circuit board and configured to radiate a first amount of emissions; a second power amplifier die that is positioned in a second orientation on the printed circuit board and configured to radiate a second amount of emissions, the second orientation differing from the first orientation by a first angle; and a third power amplifier die that is positioned in a third orientation on the printed circuit board and configured to radiate a third amount of emissions, the third orientation differing from the first orientation by a second angle different from the first angle, the third orientation differing from the second orientation by a third angle different from the first and second angles, the third power amplifier die oriented such that the first amount of emissions, the second amount of emissions, and the third amount of emissions in a first direction are less than a threshold value.

The power amplifier system of the preceding paragraph can have any sub-combination of the following features: where an output of the first power amplifier die faces the first direction and the emissions radiated by the first power amplifier die are radiated in the first direction; where the third power amplifier die is oriented such that an output of the third power amplifier die faces a second direction different than the first direction; where the power amplifier system further comprises a first antenna coupled to the first power amplifier die, the first antenna configured to radiate a fourth amount of emissions; where the third power amplifier die is oriented such that the first amount of emissions, the second amount of emissions, the third amount of emissions, and the fourth amount of emissions in the first direction are less than the threshold value; where the first antenna is oriented such that the first amount of emissions, the second amount of emissions, the third amount of emissions, and the fourth amount of emissions in the first direction are less than the threshold value; and where an output of the first power amplifier die faces the first direction, the output of the third power amplifier die facing a second direction that is a 45 degree angle from an axis that runs along the first direction.

In certain embodiments, the present disclosure relates to a wireless device. The wireless device comprises a transceiver configured to generate a first radio frequency signal and a second radio frequency signal; a first power amplifier die that is positioned in a first orientation and configured to amplify the first radio frequency signal, the first power amplifier die configured to radiate a first amount of emissions; a second power amplifier die that is positioned in a second orientation and configured to amplify the second radio frequency signal, the second orientation differing from the first orientation by a first angle, the second power amplifier die configured to radiate a second amount of emissions, the second power amplifier die oriented such that the first amount of emissions and the second amount of emissions in a first direction are less than a threshold value; a first antenna coupled to the first power amplifier die and configured to transmit the amplified first radio frequency signal; and a second antenna coupled to the second power amplifier die and configured to transmit the amplified second radio frequency signal.

The wireless device of the preceding paragraph can have any sub-combination of the following features: where an output of the first power amplifier die faces the first direction and the emissions radiated by the first power amplifier die are radiated in the first direction; where the second power amplifier die is oriented such that an output of the second power amplifier die faces a second direction different than the first direction; where the first antenna is configured to radiate a third amount of emissions; where the second power amplifier die is oriented such that the first amount of emissions, the second amount of emissions, and the third amount of emissions in the first direction are less than the threshold value; where the first antenna is oriented such that the first amount of emissions, the second amount of emissions, and the third amount of emissions in the first direction are less than the threshold value.

In certain embodiments, the present disclosure relates to a wireless device. The wireless device comprises a transceiver configured to generate a first radio frequency signal; a power amplifier die configured to amplify the first radio frequency signal, the power amplifier die including a first power amplifier circuit and a second power amplifier circuit, the first power amplifier circuit positioned in a first orientation in the power amplifier die and configured to radiate a first amount of emissions, the second power amplifier circuit positioned in a second orientation in the power amplifier die and configured to radiate a second amount of emissions, the second orientation differing from the first orientation by a first angle, the second power amplifier circuit oriented such that the first amount of emissions and the second amount of emissions in a first direction are less than a threshold value; and an antenna coupled to the power amplifier die and configured to transmit the amplified first radio frequency signal.

The wireless device of the preceding paragraph can have any sub-combination of the following features: where an output of the first power amplifier circuit faces the first direction and the emissions radiated by the first power amplifier circuit are radiated in the first direction; where the second power amplifier circuit is oriented such that an output of the second power amplifier circuit faces a second direction different than the first direction; where the antenna is configured to radiate a third amount of emissions; where the second power amplifier circuit is oriented such that the first amount of emissions, the second amount of emissions, and the third amount of emissions in the first direction are less than the threshold value; where the wireless device further comprises a second power amplifier die, the second power amplifier die including a third power amplifier circuit and a fourth power amplifier circuit, the third power amplifier circuit positioned in the first orientation in the second power amplifier die and configured to radiate a third amount of emissions, the fourth power amplifier circuit positioned in a third orientation in the second power amplifier die and configured to radiate a fourth amount of emissions, the third orientation differing from the first orientation by a second angle different from the first angle, the third orientation differing from the second orientation by a third angle different from the first and second angles; and where the second power amplifier circuit is oriented such that the first amount of emissions, the second amount of emissions, the third amount of emissions, and the fourth amount of emissions in the first direction are less than the threshold value.

BRIEF DESCRIPTION OF THE DRAWINGS

FIGS. 5A-5E illustrates another schematic block diagram of the example wireless of mobile device illustrated in FIG. 4.

DETAILED DESCRIPTION OF EMBODIMENTS

Figure 1:
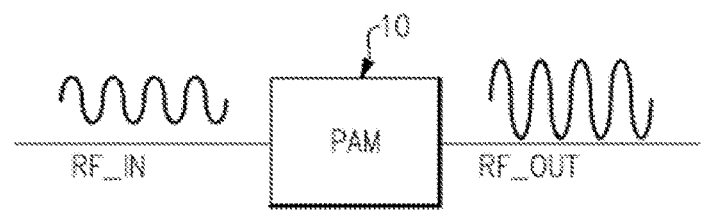
FIG. 1 is a schematic diagram of a power amplifier module for amplifying a radio frequency (RF) signal.

The headings provided herein, if any, are for convenience only and do not necessarily affect the scope or meaning of the claimed invention.

As described above, certain inventive aspects described herein are based on the realization that managing the emissions radiated by power amplifiers that operate in unlicensed frequency bands (e.g., about 2.39 GHz to 2.4835 GHz, about 5.25 GHz to 5.35 GHz, and about 5.46 GHz to 5.85 GHz) may be important because the second harmonic spectral content generated by power amplifiers operating in the unlicensed frequency bands may fall in restricted frequency bands (e.g., 4.5 GHz to 5.25 GHz and 10.6 GHz to 12.7 GHz). This may be especially true for mobile devices that implement a multi-input and multi-output (MIMO) configuration. In a MIMO configuration, a mobile device may have as many eight power amplifiers that operate concurrently or simultaneously. Given the number of concurrently operating power amplifiers, managing emissions can help improve protection against the amount of radiated second harmonic emissions resulting in FCC regulatory failures.

Generally, emissions radiated by power amplifiers are reduced via RF shielding or absorbers. For example, a power amplifier can be enclosed within a case made of conductive or magnetic materials that reduce harmonic radiated emissions. As another example, an RF absorber (e.g., tuned to a resonant frequency) made of rubber, dielectric foam, and/or the like can be coupled to a power amplifier (or placed in proximity to the power amplifier) to absorb frequencies within a narrow frequency band. However, RF shields and absorbers can be expensive and/or may occupy valuable space on a circuit board, thereby resulting in the circuit board being a larger size than would otherwise be necessary.

It was generally assumed that a power amplifier would generate harmonics, the harmonics would travel via the transmission lines to the RF antenna, and the RF antenna would directly radiate the emissions. However, matching structures inside the power amplifier can be efficient radiators and can produce larger radiated signals than the RF antennas. For example, bondwires and/or resonant structures that couple the output transistor of a power amplifier to the output matching network radiate at the second harmonic frequency. The radiation pattern from these structures is often anisotropic, meaning that the emissions generally radiate strongly in one direction. Thus, in the MIMO configuration, if the multiple power amplifiers are placed in parallel and/or in close proximity to each other, there can be some risk that radiated emissions can add together (because the emissions radiate in the same direction) and the net radiated emissions may exceed FCC regulatory limits.

Accordingly, in certain embodiments, an arrangement of power amplifiers is provided herein to reduce the emissions radiated in any given direction. One or more power amplifiers can be packaged in a single, discrete chip or die that can be placed on a printed circuit board (PCB). Alternatively or in addition, a power amplifier can be unpackaged such that the transistors, resistors, capacitors, inductors, etc. that form the power amplifier can be individually soldered to the PCB. For simplicity, the term "power amplifier" is used herein to refer both to a chip or die that includes one or more power amplifiers and to the grouping of individual circuit components that form a power amplifier (e.g., a power amplifier circuit). The techniques described herein may be implemented on any PCB that includes a plurality of power amplifiers. The power amplifiers may each be physically rotated in a manner that distributes the radiated emissions in different directions. Arranging the power amplifiers in a way that spreads out the radiated emissions may be beneficial because the FCC requires users to scan for emissions radiated over an entire sphere and report the peak emission level. By distributing the emissions in different directions, the detected (and thus reported) peak emission levels can be lower as the emissions are not concentrated in one particular direction. Thus, a mobile device that includes multiple power amplifiers may still meet FCC requirements.

FIG. 1 is a schematic diagram of a power amplifier module (PAM) 10 for amplifying a radio frequency (RF) signal. The illustrated power amplifier module 10 amplifies an RF signal (RF_IN) to generate an amplified RF signal (RF_OUT). As described herein, the power amplifier module 10 can include one or more power amplifiers.

Figure 2:
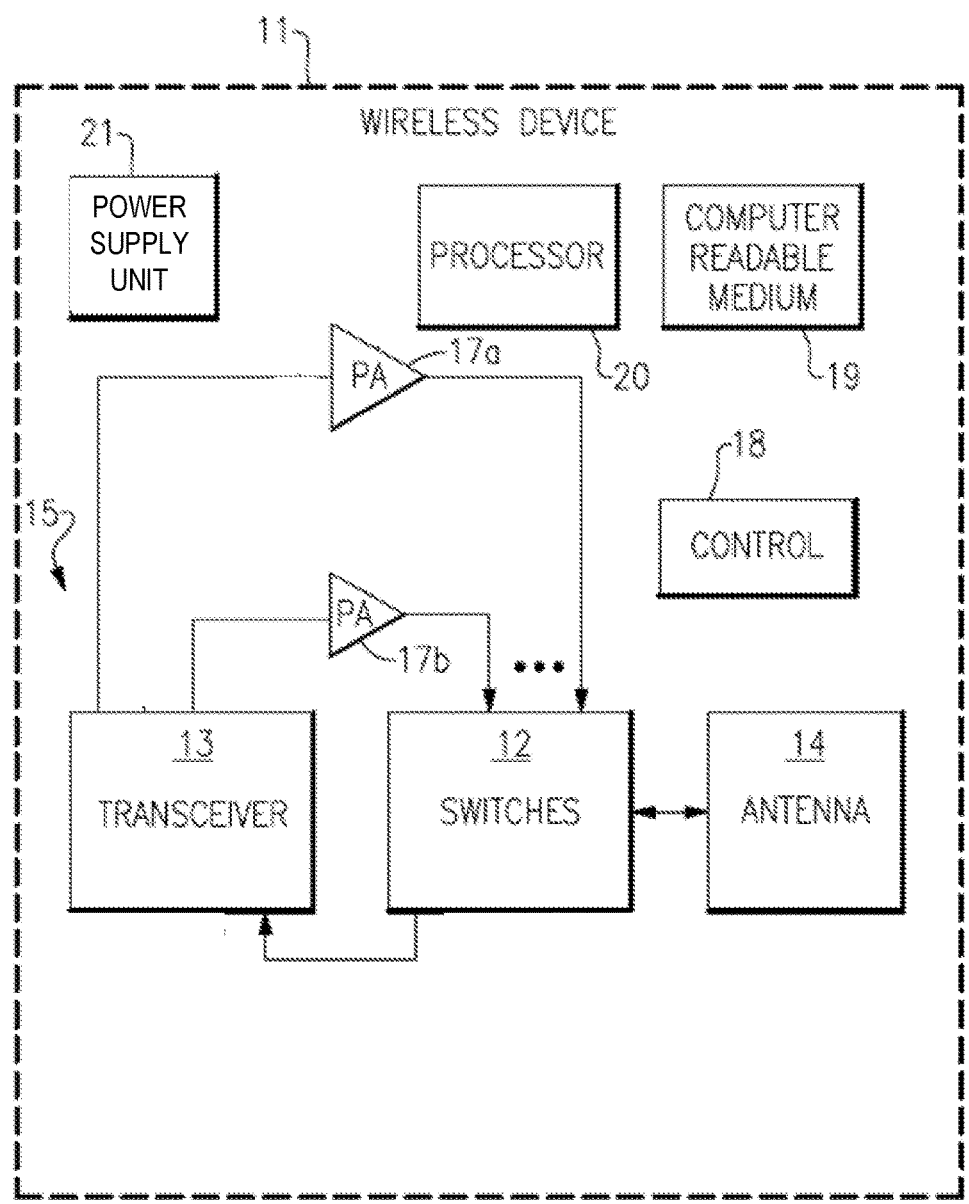
FIG. 2 is a schematic diagram of an example wireless device that can include one or more of the power amplifier modules of FIG. 1.

FIG. 2 is a schematic block diagram of an example wireless or mobile device 11 that can include one or more of the power amplifier modules 10 of FIG. 1, represented as power amplifiers 17a and 17b.

The example wireless device 11 depicted in FIG. 2 can represent a wireless access point, or a mobile device such as a multi-band/multi-mode mobile phone. By way of example, WLAN devices operate in many regions of the world, and operate in either the 2.4-2.5 GHz or 5-6 GHz frequency bands. Power amplifiers that operate in these bands are generally designed to achieve very high degrees of linearity.

One or more features of the present disclosure can be implemented in the foregoing example modes and/or bands, and in other communication standards. For example, IEEE 802.11 (e.g., IEEE 802.11ac), 2G, 3G, 4G, Long Term Evolution (LTE), and Advanced LTE are non-limiting examples of such standards. To increase data rates, the wireless device 11 can operate using complex modulated signals, such as 64 QAM signals.

In certain embodiments, the wireless device 11 can include switches 12, a transceiver 13, an antenna 14, power amplifiers 17a, 17b, a control component 18, a computer readable medium 19, a processor 20, and a power supply unit 21. While only one antenna 14 is illustrated in FIG. 2, this is not meant to be limiting. The wireless device 11 may include any number of antennas 14 (to, for example, implement a MIMO configuration).

The transceiver 13 can generate RF signals for transmission via the antenna 14. Furthermore, the transceiver 13 can receive incoming RF signals from the antenna 14.

It will be understood that various functionalities associated with the transmission and receiving of RF signals can be achieved by one or more components that are collectively represented in FIG. 2 as the transceiver 13. For example, a single component can be configured to provide both transmitting and receiving functionalities. In another example, transmitting and receiving functionalities can be provided by separate components.

Similarly, it will be understood that various antenna functionalities associated with the transmission and receiving of RF signals can be achieved by one or more components that are collectively represented in FIG. 2 as the antenna 14. For example, a single antenna can be configured to provide both transmitting and receiving functionalities. In another example, transmitting and receiving functionalities can be provided by separate antennas. In yet another example, different bands associated with the wireless device 11 can operate using different antennas. In yet another example, the same signal can be transmitted and received by separate antennas (e.g., using precoding techniques, spatial multiplexing techniques, diversity coding techniques, etc.).

In FIG. 2, one or more output signals from the transceiver 13 are depicted as being provided to the antenna 14 via one or more transmission paths 15. In the example shown, different transmission paths 15 can represent output paths associated with different bands and/or different power outputs. For instance, the two example power amplifiers 17a, 17b shown can represent amplifications associated with different power output configurations (e.g., low power output and high power output), and/or amplifications associated with different bands. Although FIG. 2 illustrates a configuration using two transmission paths 15 and two power amplifiers 17a, 17b, the wireless device 11 can be adapted to include more or fewer transmission paths 15 and/or more or fewer power amplifiers. Furthermore, while the power amplifiers 17a, 17b are illustrated as facing the same direction, this is not meant to be limiting. The power amplifiers 17a, 17b may be physically rotated in different directions (e.g., to face different edges of the wireless device 11) to distribute the emissions radiated by each power amplifier 17a, 17b, as described in greater detail herein.

The antenna 14 can receive a signal that is provided to the transceiver 13 and can transmit a signal provided by the power amplifiers 17a, 17b. The switches 12 can be configured to facilitate switching between a receive mode (e.g., a signal received by the antenna 14 is provided to the transceiver 13) and a transmit mode (e.g., a signal is provided to the antenna 14 for transmission).

FIG. 2 shows that in certain embodiments, a control component 18 can be provided for controlling various control functionalities associated with operations of the switches 12, the power amplifiers 17a, 17b, and/or other operating components.

In certain embodiments, a processor 20 can be configured to facilitate implementation of various processes described herein. The processor 20 can implement various computer program instructions. The processor 20 can be a general purpose computer, special purpose computer, or other programmable data processing apparatus.

In certain embodiments, these computer program instructions may also be stored in a computer-readable memory 19 that can direct the processor 20 to operate in a particular manner, such that the instructions stored in the computer-readable memory 19.

The power supply unit 21 can be any regulator or suitable battery for use in the wireless device 11. For example, the power supply unit 21, if a regulator, can be configured to supply one of a plurality of discrete supply voltages (e.g., either 3.3V or 5V). The power supply unit 21, if a battery, such as a lithium-ion battery, can supply a range of supply voltages (e.g., from 2.7V to 4.6V). If the power supply unit 21 is a battery, the power consumed from the power supply unit 21 can be reduced to improve the battery life of the wireless device 11. In certain configurations, the power amplifiers 17a, 17b can be implemented using CMOS processing, which can lower cost and/or enhance integration. However, other configurations of the power amplifiers 17a, 17b are possible. For example, the power amplifiers 17a, 17b can be implemented using III-V semiconductor processing, such as Gallium Arsenide (GaAs) processing.

Power amplifiers can be included in radio frequency systems to amplify a wireless local area network (WLAN) signal for transmission. For example, certain wireless devices can communicate using not only cellular standards, but also using other communication standards, including, for example, a WLAN standard such as WI-FI or IEEE 802.11 (e.g., IEEE 802.11ac), as described herein.

Figure 3:
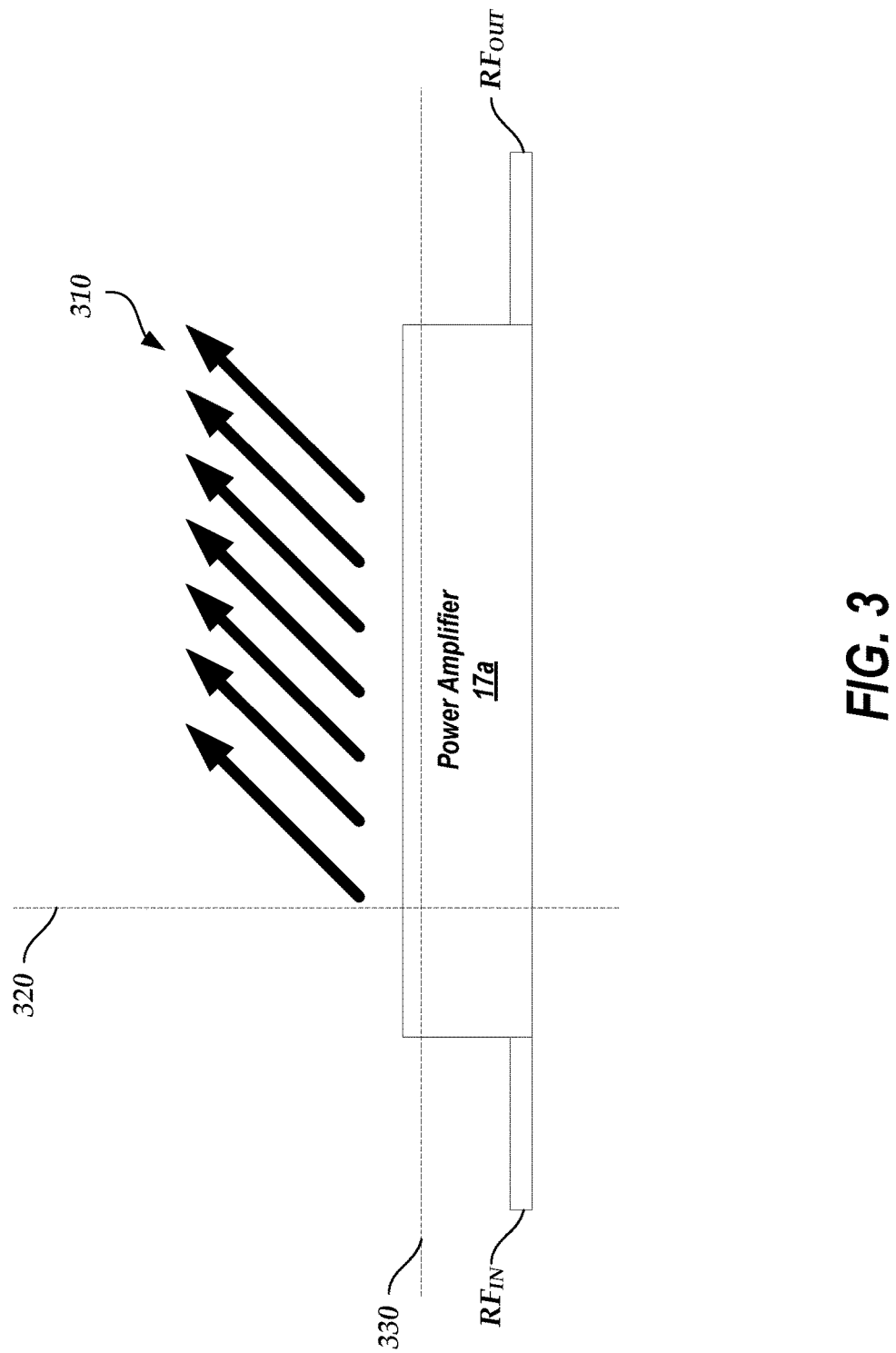
FIG. 3 is a side view of a power amplifier, such as the power amplifier of FIG. 2.

FIG. 3 is a side view of the power amplifier 17a of FIG. 2. As illustrated in FIG. 3, the power amplifier 17a has an input, represented by $RF_{IN}$, and an output, represented by $RF_{OUT}$. Generally, emissions 310 produced by the power amplifier 17a are radiated in a direction toward the output. In some embodiments, the emissions 310 are radiated away from the top of the power amplifier 17a toward the output $RF_{OUT}$ at about a 45 degree angle (e.g., between about 35 degrees and 55 degrees) from an axis 320 that vertically passes through the power amplifier 17a. The emissions 310 may also radiate toward the output $RF_{OUT}$ at an angle (e.g., 45 degrees or less) from an axis 330 that passes through the input $RF_{IN}$ and the output $RF_{OUT}$. Thus, if a plurality of power amplifiers are placed in parallel with each having an output that faces the same direction, then the emissions from each power amplifier may be radiated in a direction as illustrated in FIG. 3.

Figure 4:
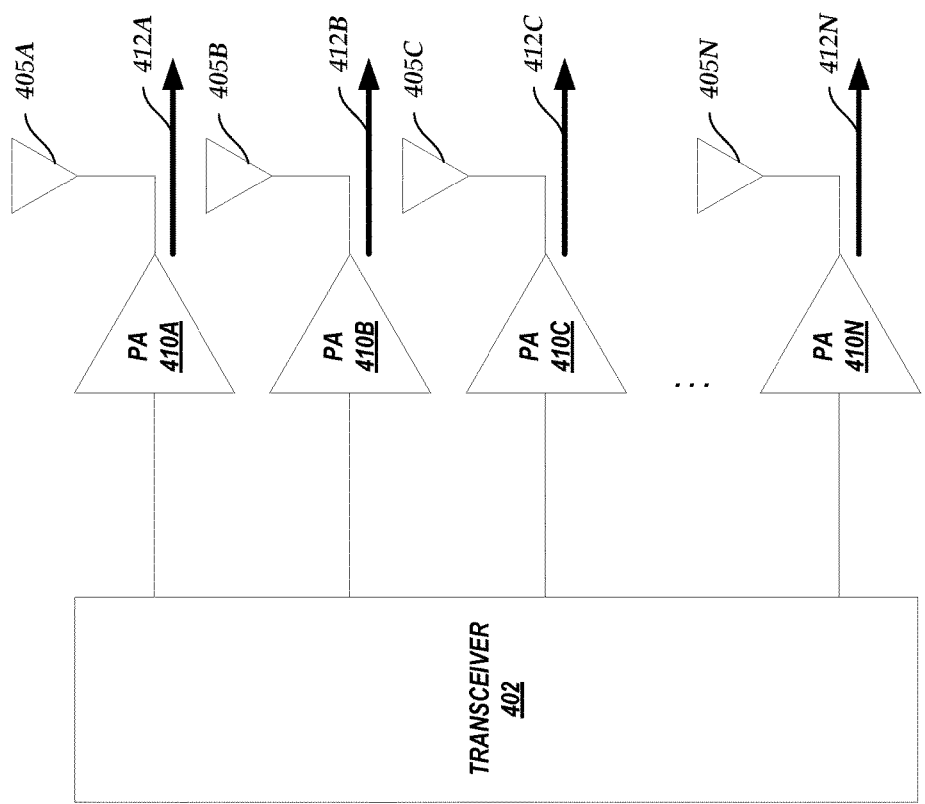
FIG. 4 illustrates another schematic block diagram of an example wireless or mobile device.

FIG. 4 illustrates another schematic block diagram of an example wireless or mobile device 400. The wireless device 400 as illustrated in FIG. 4 includes fewer components than the wireless device 11 as illustrated in FIG. 1 merely for simplicity. The wireless device 400 may include any of the components illustrated or described with respect to the wireless device 11.

As illustrated in FIG. 4, the wireless device 400 includes a transceiver 402, RF antennas 405A-N, and power amplifiers 410A-N. Thus, the wireless device 400 may be in a MIMO configuration or any other configuration that includes multiple power amplifiers and/or multiple antennas. In some embodiments, the power amplifiers 410A-N are arranged in parallel and facing the same direction such that an output of each power amplifier 410A-N is directed toward the input of each respective antenna 405A-N. Thus, emissions 412A-N generated by each respective power amplifier 410A-N may be aggregated and could exceed FCC regulatory limits.

Figure 5A:
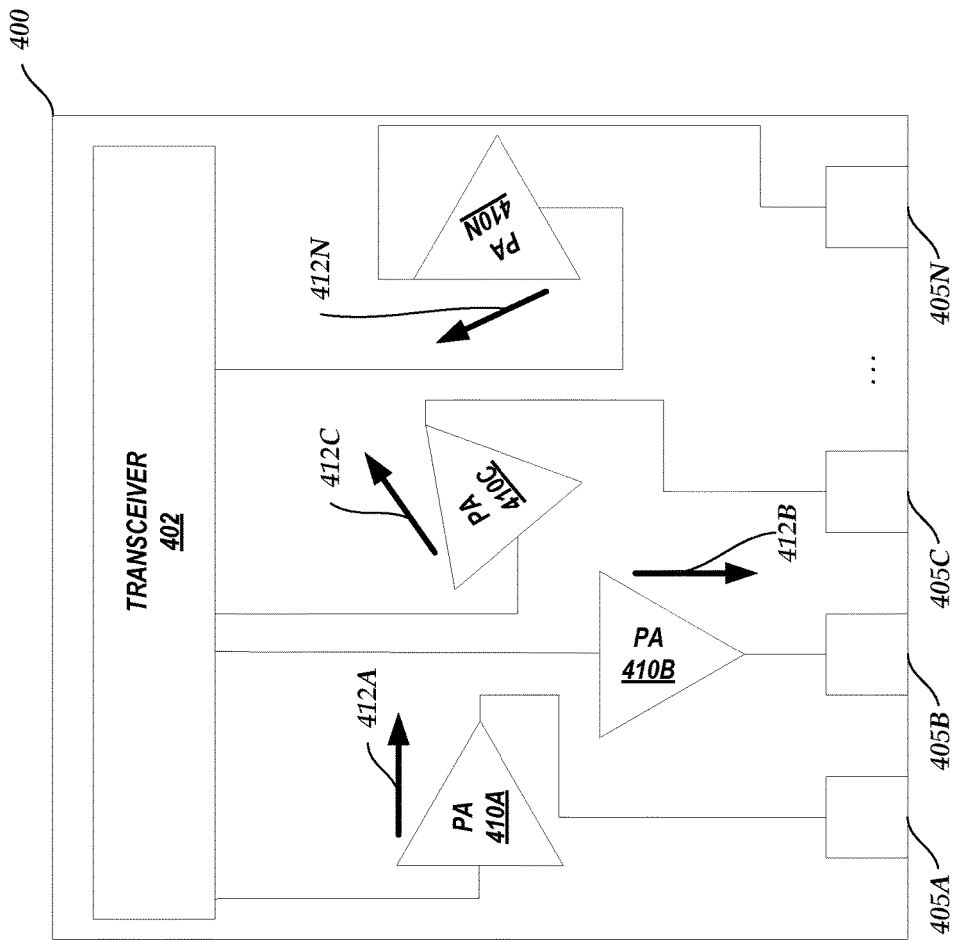
Figure 5A:
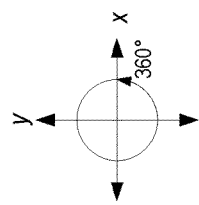

FIGS. 5A-5E illustrate another schematic block diagram of the example wireless or mobile device 400 illustrated in FIG. 4. In particular, FIGS. 5A-5E illustrate the placement of components of the wireless device 400 on a PCB when looking at the wireless device 400 from a top-down view. In FIG. 5A, the power amplifiers 410A-N are placed on the PCB and have been physically rotated to distribute the emissions 412A-N radiated by each power amplifier 410A-N. For example, the power amplifier 410A has been placed on the PCB such that the power amplifier 410A is parallel with a bottom and top edge of the wireless device 400. The output of the power amplifier 410A faces the right edge of the wireless device 400 (e.g., the output of the power amplifier 410A is oriented at an angle of 0 degrees on the x-y axis) and thus emissions 412A radiated by the power amplifier 410A are radiated toward the right edge of the wireless device 400.

The power amplifier 410B has been placed on the PCB such that the power amplifier 410B is parallel with a left and right edge of the wireless device 400, rotated at an angle 90 degrees from the placement of the power amplifier 410A along an axis that traverses the horizontal length of the wireless device 400 when looking at the wireless device 400 from a top-down view. The output of the power amplifier 410B faces the bottom edge of the wireless device 400 (e.g., the output of the power amplifier 410B is oriented at an angle of 270 degrees on the x-y axis) and thus emissions 412B radiated by the power amplifier 410B are radiated toward the bottom edge of the wireless device 400.

The power amplifier 410C has been placed on the PCB such that the power amplifier 410C is about 50 degrees from an axis that is parallel with the bottom and top edge of the wireless device 400. The output of the power amplifier 410C is directed toward the top-right corner of the wireless device 400 (e.g., the output of the power amplifier 410C is oriented at an angle of 50 degrees on the x-y axis) and thus emissions 412C radiated by the power amplifier 410C are radiated toward the top-right corner of the wireless device 400.

The power amplifier 410N has been placed on the PCB such that the power amplifier 410N is about 30 degrees from an axis that is parallel with the left and right edge of the wireless device 400. The output of the power amplifier 410N is directed toward the top of the wireless device 400 at an angle of about 30 degrees from an axis that is parallel with the left and right edge of the wireless device 400 (e.g., the output of the power amplifier 410N is oriented at an angle of 120 degrees on the x-y axis) and thus emissions 412D are radiated in the same general direction.

Figure 5B:
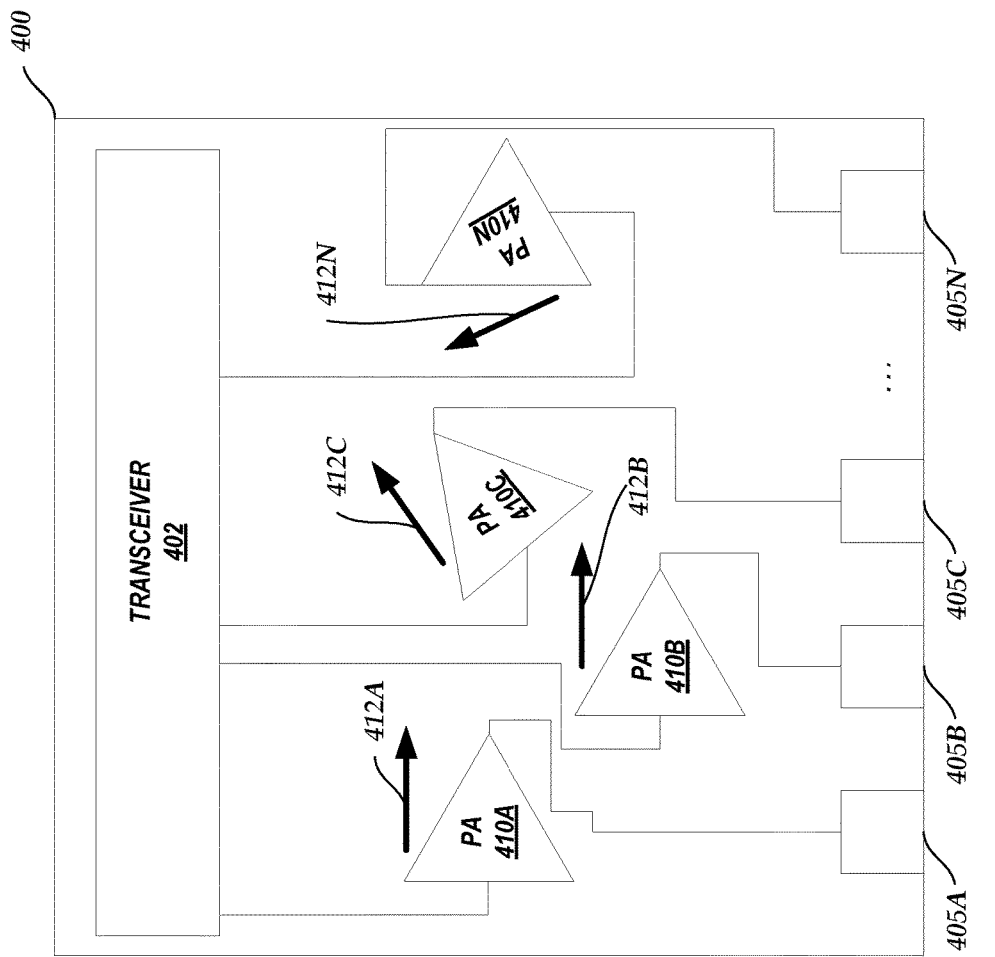
Figure 5B:
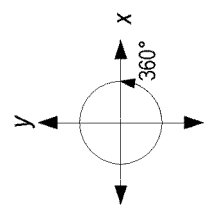

In FIG. 5B, the power amplifiers 410A-N are placed on the PCB and have been physically rotated in a different manner than illustrated in FIG. 5A to distribute the emissions 412A-N radiated by each power amplifier 410A-N. For example, the power amplifier 410A has been placed on the PCB in an orientation similar to the orientation illustrated in FIG. 5A. The power amplifier 410B, however, has been placed on the PCB such that the power amplifier 410B is oriented in the same direction as the power amplifier 410A (e.g., the output of the power amplifier 410B is oriented at an angle of 0 degrees on the x-y axis). Thus, emissions 412B radiated by the power amplifier 410B are radiated toward the same direction as the emissions 412A radiated by the power amplifier 410A. The power amplifiers 410A-B may be oriented in the same direction because, for example, the aggregated emissions 412A-B do not exceed the FCC regulatory limits.

As described herein, one or more power amplifiers can be packaged in a chip or die. As illustrated in FIG. 5C, two power amplifiers are packaged in the power amplifier die 410A and two power amplifiers are packaged in the power amplifier die 410B. The power amplifier dies 410A, 410B can be rotated in a manner as described herein to distribute the emissions 412A, 412B. For example, the output of the power amplifier die 410A can be oriented to face the right edge of the wireless device 400 (e.g., the output of the power amplifier die 410A is oriented at an angle of 0 degrees on the x-y axis) and the output of the power amplifier die 410B can be oriented to face the bottom edge of the wireless device 400 (e.g., the output of the power amplifier die 410B is oriented at an angle of 270 degrees on the x-y axis). Thus, the emissions 412A can be distributed toward the right edge of the wireless device 400 and the emissions 412B can be distributed toward the bottom edge of the wireless device 400.

Figure 5D:
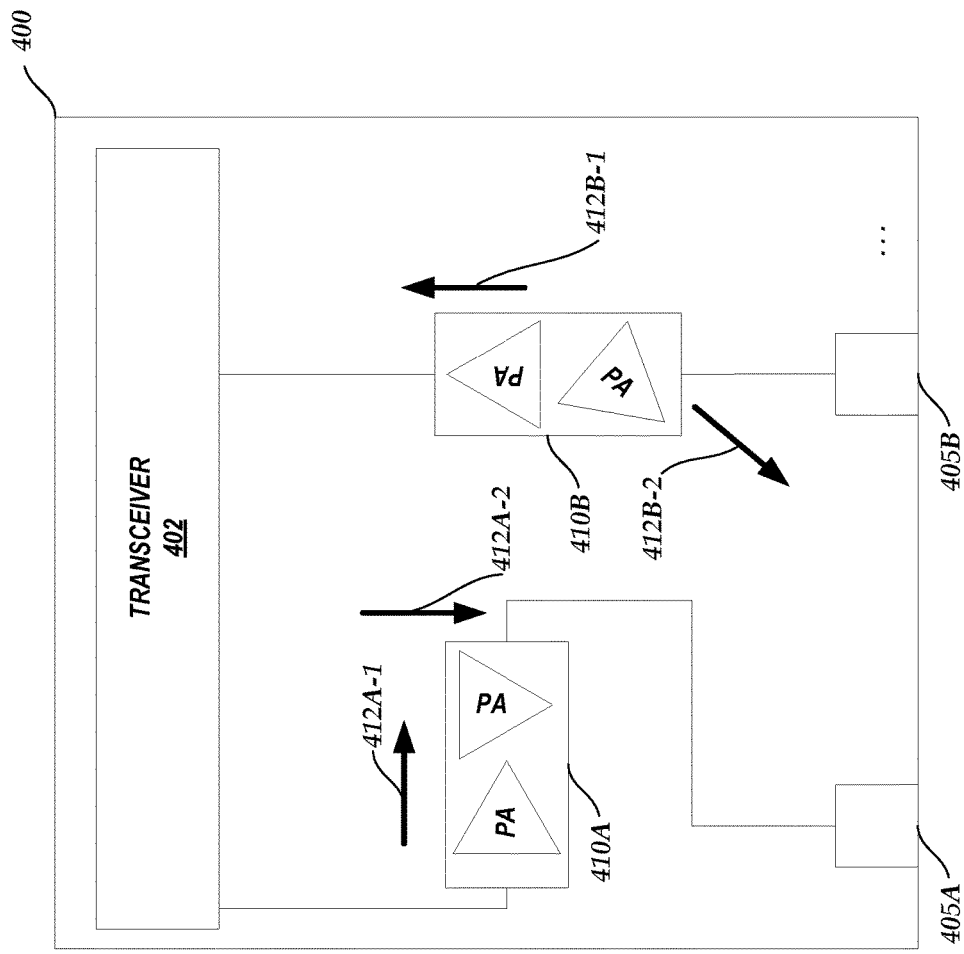
Figure 5D:
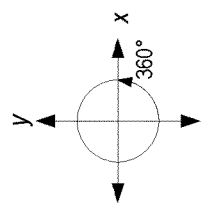

Furthermore, the individual power amplifiers in the packaged power amplifier dies 410A, 410B can be rotated, as illustrated in FIG. 5D. For example, an output of a first power amplifier in the power amplifier die 410A can face the right edge of the wireless device 400 (e.g., the output of the first power amplifier in the power amplifier die 410A is oriented at an angle of 0 degrees on the x-y axis) and an output of a second power amplifier in the power amplifier die 410A can face the bottom edge of the wireless device 400 (e.g., the output of the second power amplifier in the power amplifier die 410A is oriented at an angle of 270 degrees on the x-y axis). Thus, a portion of the emissions 412A (e.g., 412A-1) can be distributed toward the right edge of the wireless device 400 and a portion of the emissions 412A (e.g., 412A-2) can be distributed toward the bottom edge of the wireless device 400. Likewise, an output of a first power amplifier in the power amplifier die 410B can face the top edge of the wireless device 400 (e.g., the output of the first power amplifier in the power amplifier die 410B is oriented at an angle of 90 degrees on the x-y axis) and an output of a second power amplifier in the power amplifier die 410B can face the bottom-left edge of the wireless device 400 (e.g., the output of the second power amplifier in the power amplifier die 410B is oriented at an angle of 230 degrees on the x-y axis). Thus, a portion of the emissions 412B (e.g., 412B-1) can be distributed toward the top edge of the wireless device 400 and a portion of the emissions 412B (e.g., 412B-2) can be distributed toward the bottom-left edge of the wireless device 400 at an angle of 230 degrees.

In some embodiments, the angle at which the power amplifiers 410A-N are rotated is determined by a computing system (e.g., a desktop, laptop, tablet, mobile phone, etc.) that includes computer-readable memory, where the computer-readable memory stores instructions that, when executed, cause the computing system to execute an application that simulates the emissions radiated by the power amplifiers 410A-N of the wireless device 400. For example, the application can include executable program code that directs the computing system to determine an orientation of one or more power amplifiers and/or antennas to meet FCC regulatory limits. As described herein, the power amplifiers 410A-N may not all radiate the same level of harmonics and in fact the level of harmonics radiated by a power amplifier 410A-N may be dependent on the matching network at the output of the respective power amplifier 410A-N. Thus, the application may identify the level of harmonics radiated by an individual power amplifier 410A-N and use this information to determine the direction that an individual power amplifier 410A-N could be rotated to distribute the emissions in different directions (e.g., toward the top edge of the wireless device 400, toward the bottom edge of the wireless device 400, toward the left edge of the wireless device 400, toward the right edge of the wireless device 400, toward the bottom-left corner of the wireless device 400, toward the bottom-right corner of the wireless device 400, toward the top-left corner of the wireless device 400, toward the top-right corner of the wireless device 400, etc.) that would result in the wireless device 400 meeting FCC regulatory limits.

In further embodiments, the application takes into account additional information to determine the angle of rotation of the power amplifiers 410A-N as placed on the PCB of the wireless device 400. For example, the application may use a representation of a schematic diagram of the components of the wireless device 400 to identify the relative location of the power amplifiers 410A-N with respect to the other components of the wireless device 400. The application may then suggest rotating the power amplifiers 410A-N in a way that also minimizes bondwires or other connections between the power amplifiers 410A-N and the other components of the wireless device 400, that prevents the overlap of connections between the power amplifiers 410A-N and the other components of the wireless device 400, that reduce interference between the different components of the wireless device 400, and/or that causes the PCB layout to meet some or all of the design requirements of the wireless device 400.

In other embodiments, the angle at which the power amplifiers 410A-N are rotated is determined manually by testing an operational wireless device 400. For example, the power amplifiers 410A-N may initially be soldered onto a PCB along with other components of the wireless device 400. The wireless device 400 can be turned on and the amount of emissions generated in various directions around the wireless device 400 (e.g., in a spherical area surrounding the wireless device 400) can be measured using a measurement tool or probe. If the amount of emissions in a given direction exceed FCC regulatory limits, emissions radiated by one or more of the power amplifiers 410A-N can be measured (e.g., by placing the measurement tool or probe above the respective power amplifier 410A-N) to determine which power amplifiers 410A-N are contributing to the emissions radiated in the direction that exceed FCC regulatory limits. Once such power amplifiers 410A-N are identified, one or more of the power amplifiers 410A-N can be rotated such that an output of the power amplifier 410A-N faces a direction in which the radiated emissions do not exceed the FCC regulatory limits (and still will not exceed the FCC regulatory limits if the rotation is made). The one or more power amplifiers 410A-N can be rotated by, for example, de-soldering the respective power amplifier 410A-N and re-soldering the respective power amplifier 410A-N in the new rotated orientation. After rotation, the emissions radiated by the power amplifiers 410A-N when the wireless device 400 is operating can be measured again and the above-process can be repeated until the emissions radiated in any given direction fall below the FCC regulatory limits. Alternatively, the wireless device 400 may be a test device and future wireless devices 400 can be designed with the identified rotations.

In some embodiments, each power amplifier 410A-N has an output that faces a different direction, such as illustrated in FIG. 5A. In other embodiments, two or more power amplifiers 410A-N have outputs that face the same direction and other power amplifiers 410A-N have outputs that face another direction, such as illustrated in FIG. 5B.

In addition to orienting the power amplifiers 410A-N such that the emissions 412A-N radiated by the power amplifiers 410A-N are distributed in different directions around the wireless device 400, one or more of the power amplifiers 410A-N may be shielded using an RF shield and/or one or more of the power amplifiers 410A-N may be coupled to or be in proximity to an RF absorber. The RF shield and/or the RF absorber may be smaller than would otherwise be expected if the power amplifiers 410A-N are not rotated as described herein, however, because of the benefits provided by changing the orientation of the power amplifiers 410A-N. Thus, the emissions 412A-N generated by the power amplifiers 410A-N may be reduced in addition to being distributed in different directions.

Figure 5E:
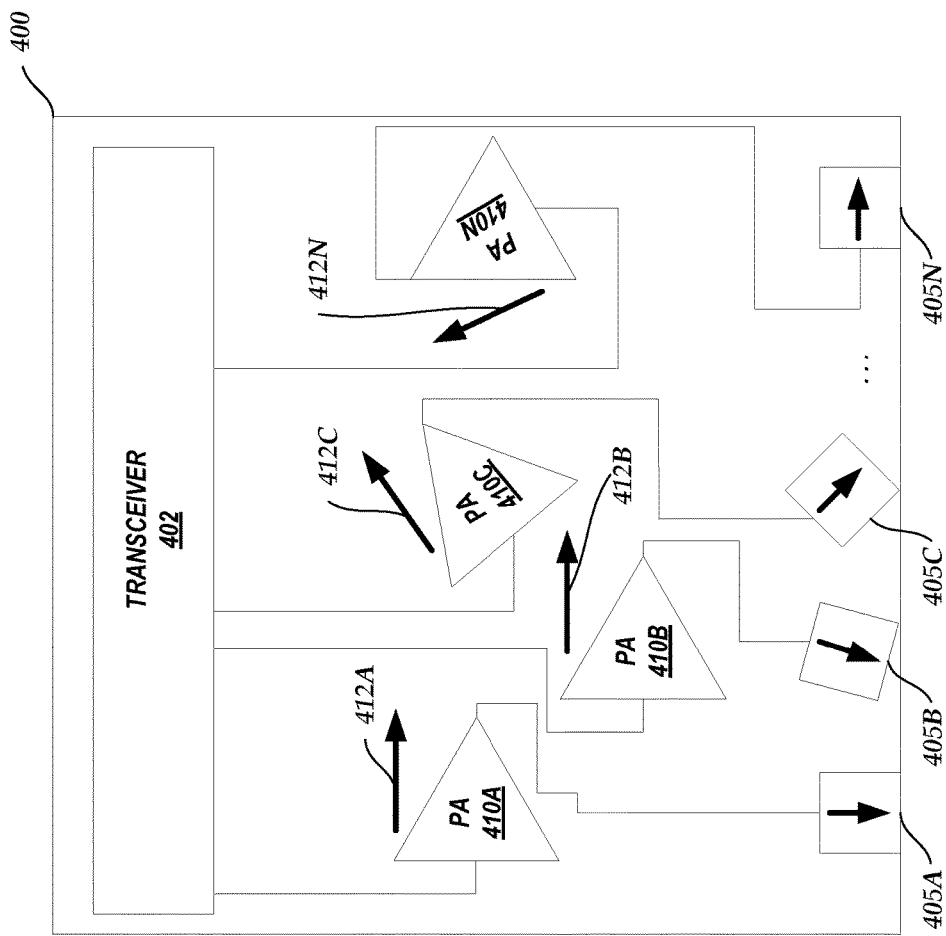
Figure 5E:
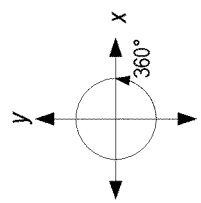

In further embodiments, the antennas 405A-N can be physically rotated to distribute harmonics radiated by the antennas 405A-N in different directions, as illustrated in FIG. 5E. As described herein, while the power amplifiers 410A-N themselves produce and radiate emissions 412A-N, the antennas 405A-N may also radiate emissions (e.g., by receiving harmonics generated by the power amplifiers 410A-N via the transmission lines that couple the power amplifiers 410A-N to the antennas 405A-N). In implementations of the wireless device 400 in which the antennas 405A-N are isotropic (e.g., transmit signals in some or all directions), the actual orientation of the antennas 405A-N may not be important given that the antennas 405A-N are transmitting in all directions anyway. Thus, the antennas 405A-N can be rotated in a manner as described above with respect to the power amplifiers 410A-N to distribute the emissions radiated by the antennas 405A-N in different directions across the wireless device 400. For example, the antenna 405A can be oriented such that the output of the antenna 405A (e.g., the opposite side from which the transmission line from the power amplifier 410A couples to the antenna 405A) faces the bottom edge of the wireless device 400 (e.g., the output of the antenna 405A is oriented at an angle of 270 degrees on the x-y axis, as indicated by the arrow in the antenna 405A). The antenna 405B can be oriented such that the output of the antenna 405B faces a direction that is at an angle 15 degrees from an axis that runs parallel to the left and right edge of the wireless device 400 (e.g., the output of the antenna 405B is oriented at an angle of 255 degrees on the x-y axis, as indicated by the arrow in the antenna 405B). The antenna 405C can be oriented such that the output of the antenna 405C faces a direction that is at an angle 45 degrees from an axis that runs parallel to the left and right edge of the wireless device 400 (e.g., the output of the antenna 405C is oriented at an angle of 315 degrees on the x-y axis, as indicated by the arrow in the antenna 405C). The antenna 405N can be oriented such that the output of the antenna 405N faces a direction that is parallel with an axis that runs parallel to the top and bottom edge of the wireless device 400 (e.g., the output of the antenna 405N is oriented at an angle of 0 degrees on the x-y axis, as indicated by the arrow in the antenna 405N).

The antennas 405A-N can be rotated at any angle such that the outputs of the antennas 405A-N face any direction. The application described above can simulate the emissions 412A-N radiated by the power amplifiers 410A-N and the emissions radiated by the antennas 405A-N to determine the optimal orientation of the power amplifiers 410A-N and/or the antennas 405A-N on the PCB of the wireless device 400. Alternatively, the emissions 412A-N radiated by the antennas 405A-N can be measured using the measurement tool or probe and such information can be taken into account when determining which power amplifiers 410A-N and/or antennas 405A-N to rotate.

Example Flowchart for Determining the Orientation of Power Amplifiers

Figure 6:
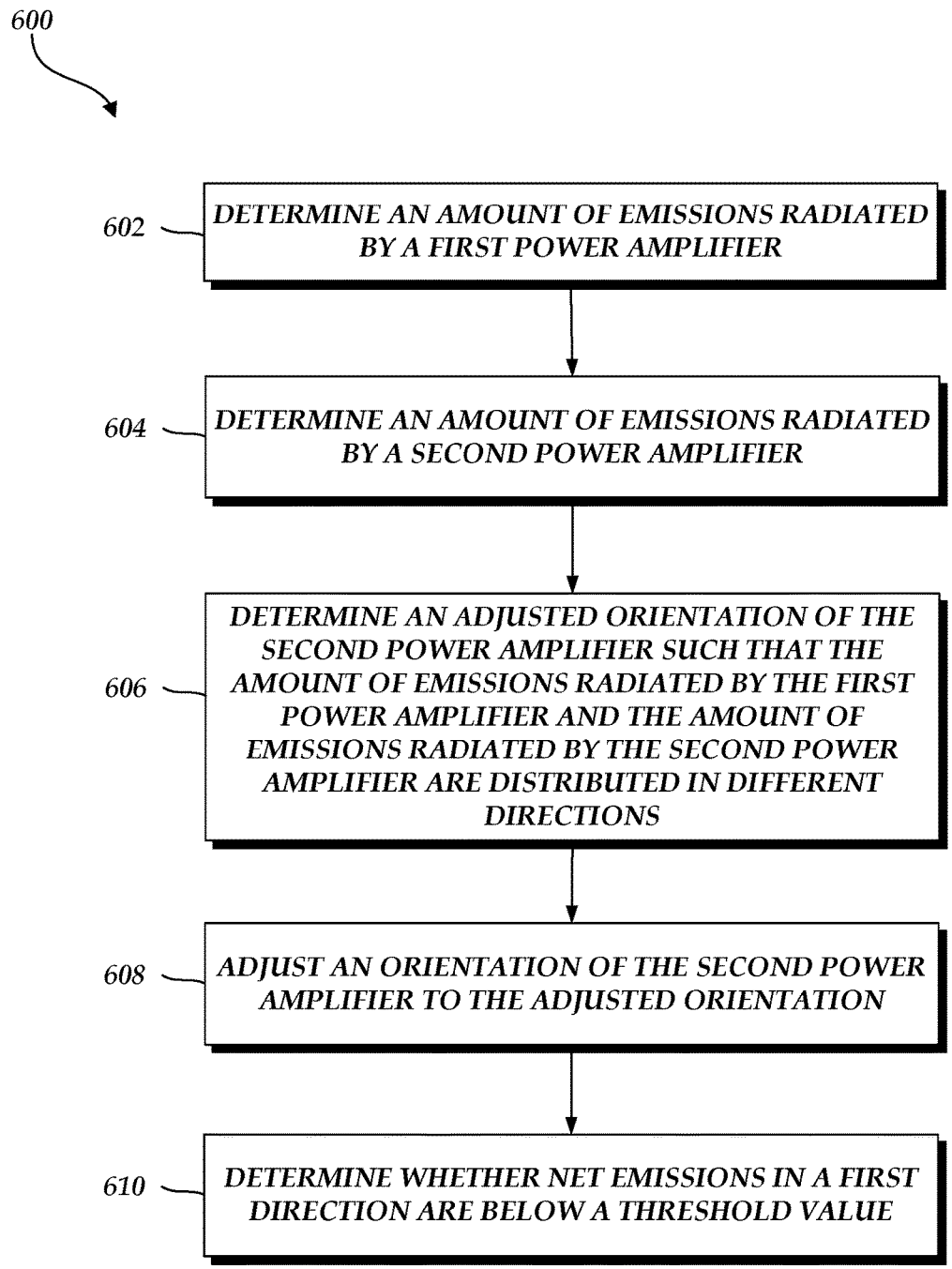
FIG. 6 illustrates an example flowchart of a process for determining the physical orientation of power amplifiers laid out on the PCB of a wireless device, such as the wireless device of FIG. 2 and/or the wireless device of FIGS. 4 and 5A-5E.

FIG. 6 illustrates an example flowchart of a process 600 for determining the physical orientation of power amplifiers laid out on the PCB of a wireless device, such as the wireless device 11 of FIG. 2 and/or the wireless device 400 of FIGS. 4-5E. The process 600 may be performed by a computing system (e.g., a desktop, laptop, tablet, mobile phone, etc.) that includes computer-readable memory, where the computer-readable memory stores instructions that, when executed, cause the computing system to execute an application (e.g., a circuit simulator) that performs the process 600. The process 600 can be implemented, in part or entirely, by a hardware-only application-specific processor of the computing system that executes the instructions. The process 600 may include fewer or additional steps than are illustrated in FIG. 6. Furthermore, the process 600 may perform the steps illustrated in FIG. 6 in any order.

At block 602, an amount of emissions radiated by a first power amplifier is determined. For example, the computing system may use a schematic diagram and/or a PCB layout of a wireless device to identify components that may affect the amount of emissions radiated by the first power amplifier to simulate the amount of radiated emissions. Such structures may include the matching structures inside the first power amplifier (e.g., a transistor at the output of the first power amplifier), the matching network at the output of the first power amplifier, bondwires or transmission lines that couple the first power amplifier to the matching network at the output of the first power amplifier, and/or the like.

At block 604, an amount of emissions radiated by a second power amplifier is determined. The first and second power amplifiers may be included in the same wireless device. Each power amplifier may be used to transmit signals using a different antenna. The amount of emissions radiated by the second power amplifier may be determined in a same manner as described above with respect to the first power amplifier. In further embodiments, the computing system determines an amount of emissions radiated by the antenna coupled to the first power amplifier and an amount of emissions radiated by the antenna coupled to the second power amplifier.

At block 606, an adjusted orientation of the second power amplifier is determined such that the amount of emissions radiated by the first power amplifier and the amount of emissions radiated by the second power amplifier are distributed in different directions. For example, the first power amplifier may be oriented such that an output of the first power amplifier is parallel with an axis that runs along a bottom and top edge of the PCB when looking at the PCB from a top-down view (such as illustrated in FIGS. 5A-5E). The computing system may use the determined amount of emissions radiated by the first and second power amplifiers to determine an orientation of the second power amplifier such that the net emissions measured over any portion of the PCB (when both power amplifiers are operating) is less than FCC regulatory limits. In some cases, such an orientation may be having the output of the second power amplifier face the bottom edge of the PCB such that the output of the second power amplifier is parallel with an axis that runs along a left and right edge of the PCB when looking at the PCB from a top-down view. The output of the second power amplifier can be oriented at any angle (e.g., from about 0 degrees to about 360 degrees) relative to the orientation of the output of the first power amplifier. In further embodiments, the antenna coupled to the first power amplifier and/or the antenna coupled to the second power amplifier can be rotated in different directions to reduce the net emissions measured in any one direction.

At block 608, the orientation of the second power amplifier is adjusted to the adjusted orientation. For example, the computing system can orient the second power amplifier in the adjusted orientation to determine whether FCC regulatory limits are met.

At block 610, whether net emissions in a first direction are below a threshold value is determined. For example, the threshold value can be the FCC regulatory limits. Once the orientation of the second power amplifier is adjusted to the adjusted orientation, the computing system may again simulate the amount of emissions radiated by the first power amplifier and the second power amplifier. If the net emissions radiated by the first power amplifier and the second power amplifier in a first direction are below the FCC regulatory limits, then the computing system can write a file that can be used (e.g., by a soldering machine) to orient the first and second power amplifiers on a PCB, can generate a report that identifies the orientations of the first and second power amplifiers that results in meeting FCC regulatory limits (e.g., a report with instructions that can be followed manually to solder the power amplifiers to a PCB), and/or the like. If the net emissions radiated by the first power amplifier and the second power amplifier in the first direction are above the FCC regulatory limits, the process 600 can repeat any of blocks 602 through 610 until the net emissions in the first direction are below the FCC regulatory limits. The process 600 can also be repeated until the net emissions in all directions are below the FCC regulatory limits.

Figure 7:
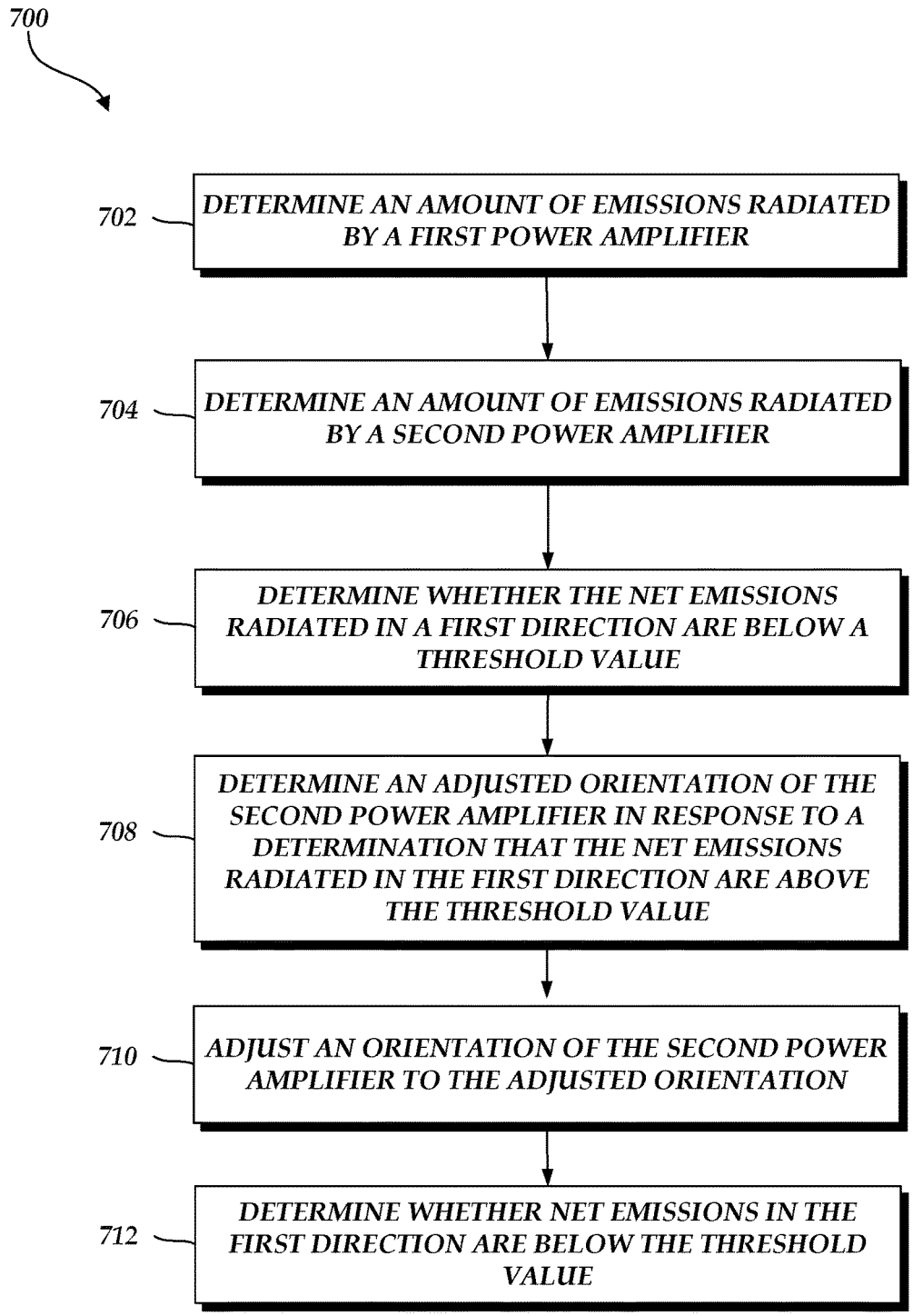
FIG. 7 illustrates another example flowchart of a process for determining the physical orientation of power amplifiers laid out on the PCB of a wireless device, such as the wireless device of FIG. 2 and/or the wireless device 400 of FIGS. 4-5E.

FIG. 7 illustrates another example flowchart of a process 700 for determining the physical orientation of power amplifiers laid out on the PCB of a wireless device, such as the wireless device 11 of FIG. 2 and/or the wireless device 400 of FIGS. 4-5E. The process 700 may be performed manually. The process 700 may include fewer or additional steps than are illustrated in FIG. 7. Furthermore, the process 700 may perform the steps illustrated in FIG. 7 in any order.

At block 702, an amount of emissions radiated by a first power amplifier is determined. For example, the first power amplifier can be soldered to the PCB of a wireless device that is operational. The amount of emissions radiated by the first power amplifier can be measured by a measurement tool or probe while the wireless device is operating.

At block 704, an amount of emissions radiated by a second power amplifier is determined. The first and second power amplifiers may be included on the same PCB of the wireless device. Each power amplifier may be used to transmit signals using a different antenna. The amount of emissions radiated by the second power amplifier may be determined in a same manner as described above with respect to the first power amplifier. In further embodiments, an amount of emissions radiated by the antenna coupled to the first power amplifier and an amount of emissions radiated by the antenna coupled to the second power amplifier are also measured using the measurement tool or probe.

At block 706, whether the net emissions radiated in a first direction are below a threshold value is determined. For example, the threshold value can be the FCC regulatory limits.

At block 708, in response to a determination that the net emissions radiated in the first direction are above the threshold value, an adjusted orientation of the second power amplifier is determined. For example, a determination can be made of a second direction in which the net emissions are less than the threshold value to a degree such that the addition of emissions radiated by the second power amplifier still would result in the net emissions radiated in the second direction being less than the threshold value. The adjusted orientation can be an orientation of the second power amplifier that results in the emissions radiated by the second power amplifier being radiated in the second direction.

At block 710, the orientation of the second power amplifier is adjusted to the adjusted orientation. For example, the second power amplifier can be de-soldered from the PCB and re-soldered to the PCB to adjust the orientation to the adjusted orientation.

At block 712, whether net emissions in the first direction are below the threshold value is determined. For example, once the orientation of the second power amplifier is adjusted to the adjusted orientation, the amount of emissions radiated in the first direction can be measured again. If the net emissions radiated in the first direction are below the FCC regulatory limits, then the process 700 is complete. Otherwise, the process 700 can repeat any of blocks 702 through 712 until the net emissions in the first direction are below the FCC regulatory limits. The process 700 can also be repeated until the net emissions in all directions are below the FCC regulatory limits.

APPLICATIONS

Some of the embodiments described above have provided examples in connection with wireless devices or mobile phones. However, the principles and advantages of the embodiments can be used for any other systems or apparatus that have needs for multiple power amplifiers.

Such varied orientations of power amplifiers can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of determining the physical orientation of power amplifiers laid out on a printed circuit board comprising:
   determining an amount of emissions radiated by a first power amplifier die that is positioned in a first orientation on the printed circuit board;
   determining an amount of emissions radiated by a second power amplifier die that is positioned in a second orientation on the printed circuit board;
   determining a third orientation of the second power amplifier die different than the second orientation, such that when the second power amplifier die is in the third orientation, the amount of emissions radiated by the first power amplifier die and the amount of emissions radiated by the second power amplifier die are distributed in different directions;
   causing adjustment of the second power amplifier die from the second orientation to the third orientation; and
   generating a file that instructs a machine to orient, on the printed circuit board, the first power amplifier die in the first orientation and the second power amplifier die in the third orientation.

2. The method of claim 1 wherein an output of the first power amplifier die faces a first direction and the emissions radiated by the first power amplifier die are radiated in the first direction.

3. The method of claim 2 wherein the third orientation of the second power amplifier die includes an output of the second power amplifier die facing a second direction different than the first direction.

4. The method of claim 1 further comprising determining an amount of emissions radiated by a first antenna coupled to the first power amplifier die.

5. The method of claim 4 wherein determining a third orientation of the second power amplifier die includes determining the orientation of the second power amplifier die such that the amount of emissions radiated by the first power amplifier die, the amount of emissions radiated by the second power amplifier die, and the amount of emissions radiated by the first antenna die are distributed in different directions.

6. The method of claim 4 further comprising determining an adjusted orientation of the first antenna such that the amount of emissions radiated by the first power amplifier die, the second power amplifier die, or the first antenna in a first direction is less than a threshold value.

7. The method of claim 1 wherein determining a third orientation of the second power amplifier die includes determining the third orientation of the second power amplifier die such that the amount of emissions radiated by the first power amplifier die or the second power amplifier die in a first direction is less than a threshold value.

8. The method of claim 1 wherein the first and second power amplifier dies are physical devices laid out on the printed circuit board.

9. The method of claim 8 wherein determining an amount of emissions radiated by a first power amplifier die and determining an amount of emissions radiated by a second power amplifier die both include measuring the amount of emissions using a sensor.

10. The method of claim 8 wherein causing adjustment of the second power amplifier die includes physically adjusting the orientation of the second power amplifier die from the second orientation to the third orientation, and measuring an amount emissions radiated by the second power amplifier die when in the third orientation using the sensor.

11. The method of claim 1 wherein the first and second power amplifier dies are simulated power amplifier dies instantiated in a software circuit simulator.

12. The method of claim 10 wherein the determining an amount of emissions radiated by a first power amplifier die and determining an amount of emissions radiated by a second power amplifier die both include using the software circuit simulator to simulate an amount of emissions.

13. The method of claim 12 wherein causing adjustment of the second power amplifier die includes using the software circuit simulator to simulate a change in the orientation of the second power amplifier die from the second orientation to the third orientation, and using the software circuit simulator to measure an amount emissions radiated by the second power amplifier die when in the third orientation.

14. The method of claim 1 wherein each of the first and second power amplifier dies include a single power amplifier.

15. The method of claim 1 wherein one or more of the first and second power amplifier dies include multiple power amplifiers.

16. A method of determining the physical orientation of power amplifiers laid out on a printed circuit board comprising:
   determining an amount of emissions radiated by a first power amplifier die that is positioned in a first orientation on the printed circuit board;
   determining an amount of emissions radiated by a second power amplifier die that is positioned in a second orientation on the printed circuit board;
   determining whether the amount of emissions radiated by the first power amplifier die in a first direction and the amount of emissions radiated by the second power amplifier die in the first direction exceed a threshold value;
   determining a third orientation of the second power amplifier die different than the second orientation in response to a determination that the amount of emissions radiated by the first power amplifier die in the first direction and the amount of emissions radiated by the second power amplifier die in the first direction exceed the threshold value, such that the amount of emissions radiated by the first power amplifier die in the first direction while in the first orientation and the amount of emissions radiated by the second power amplifier die in the first direction while in the third orientation are below the threshold value;

adjusting an orientation of the second power amplifier die from the second orientation to the third orientation; and generating a file that instructs a machine to orient, on the printed circuit board, the second power amplifier die in the third orientation.

17. The method of claim 16 wherein the third orientation of the second power amplifier die includes an output of the second power amplifier die facing a second direction different than the first direction.

18. The method of claim 16 wherein the file instructs the machine to solder the second power amplifier die to the printed circuit board in the third orientation.

19. A non-transitory computer-readable medium having stored thereon a simulation application configured to run on a computing system, the simulation application comprising executable program code that directs the computing device to implement a process comprising:

determining an amount of emissions radiated by a first power amplifier die that is positioned in a first orientation on a simulated printed circuit board;

determining an amount of emissions radiated by a second power amplifier die that is positioned in a second orientation on the simulated printed circuit board;

determining whether the amount of emissions radiated by the first power amplifier die in a first direction and the amount of emissions radiated by the second power amplifier die in the first direction exceed a threshold value;

adjusting an orientation of the second power amplifier die to a third orientation different than the second orientation in response to a determination that the amount of emissions radiated by the first power amplifier die in the first direction and the amount of emissions radiated by the second power amplifier die in the first direction exceed the threshold value;

in response to a determination that the amount of emissions radiated by the first power amplifier die in the first direction while in the first orientation and the amount of emissions radiated by the second power amplifier in the first direction while in the third orientation exceed the threshold value, continuing to adjust an orientation of the second power amplifier die until the amount of emissions radiated by the first power amplifier die in the first direction and the amount of emissions radiated by the second power amplifier die in the first direction is below the threshold value; and generating a file that instructs a machine to orient, on an actual printed circuit board, the second power amplifier die in an orientation in which the amount of emissions radiated by the first power amplifier die in the first direction and the amount of emissions radiated by the second power amplifier die in the first direction is below the threshold value.

20. The non-transitory computer-readable medium of claim 19 wherein the machine comprises a soldering machine, and wherein the file instructs the soldering machine to orient the first power amplifier die in the first orientation on the actual printed circuit board.

* * * * *